United States Patent [19]
Gatherer

[11] Patent Number: 5,461,640
[45] Date of Patent: Oct. 24, 1995

[54] METHOD AND SYSTEM FOR OPTIMIZING AN EQUALIZER IN A DATA TRANSMISSION SYSTEM

[75] Inventor: Alan Gatherer, Plano, Tex.

[73] Assignee: Texas Instruments Incorporated, Dallas, Tex.

[21] Appl. No.: 253,471

[22] Filed: Jun. 3, 1994

[51] Int. Cl.$^6$ ................................................ H03H 7/30
[52] U.S. Cl. ........................ 375/231; 364/724.2
[58] Field of Search ........................... 375/13, 14, 96, 375/1, 229, 231, 208, 340, 232; 364/724.12, 728.03, 724.19, 724.2, 728.07; 333/18, 28 R

[56] References Cited

U.S. PATENT DOCUMENTS

| | | | |
|---|---|---|---|
| 4,408,332 | 10/1983 | Sari | 375/14 |
| 5,285,474 | 2/1994 | Chow et al. | 375/13 |
| 5,293,402 | 2/1994 | Crespo et al. | 375/14 |
| 5,297,165 | 3/1994 | Ueda et al. | 375/12 |
| 5,297,166 | 3/1994 | Batruni | 375/14 |
| 5,303,264 | 4/1994 | Ohsawa | 375/12 |

OTHER PUBLICATIONS

D. W. Marshall and J. Bingham, Asymmetric Digital Subscriber Line (ADSL) Working Draft Standard T1E1.4/93-007, Nov. 15, 1993, Lakewood.

J. S. Chow, Finite–Length Equalization for Multi–Carrier Transmission Systems, Ph.D. Dissertation, Stanford University, Calif., Jun. 1992, pp. i–xiii and 1–168.

E. A. Lee and D. G. Messerschmitt, Digital Communication, Kluwer Academic Publishers, Boston, Mass., 1988, pp. 331–335 and 394–397.

T. Kailath, Linear Systems, Prentice–Hall, Englewood Cliffs, 1980, p. 656.

G. H. Golub and C. F. Van Loan, Matrix Computations, 2nd Ed., John Hopkins University Press, Baltimore, Md., 1989, pp. 351–352.

G. D. Fourney, Jr., Maximum–Likelihood Sequence Estimation of Digital Sequences in the Presence of Intersymbol Interference, IEEE Transactions on Information Theory, vol. IT–18, No. 3, pp. 363–378, May 1972.

J. M. Cioffi, J. S. Chow and J. T. Aslanis, Detailed DMT Transmitter Description for ADSL, ANSI T1E1.4/93–084, Palo Alto, Calif., Apr. 15, 1993, pp. 1–4.

D. D. Falconer and F. R. Magee, Jr., Adaptive Channel Memory Truncation for Maximum Likelihood Sequence Estimation, The Bell System Technical Journal, vol. 52, No. 9, Nov. 1973, pp. 1541–1562.

*Primary Examiner*—Stephen Chin
*Assistant Examiner*—Tesfaldet Bocure
*Attorney, Agent, or Firm*—Tammy L. Williams; Richard L. Donaldson

[57] ABSTRACT

The present invention includes an optimized equalizer (22) used to equalize a signal (at 20) received from a distorting channel (18). First, auto and cross correlations of a predetermined training sequence and the received signal are generated (at 21c). The correlations are then used to generate a solution matrix (21d). An eigenvector associated with a maximum eigenvalue of a function of the correlations is formed (21e) using the solution matrix (21d) and then used to generate equalizer control signals (21f) or parameters defining taps of a filter implementing the equalizer (22).

11 Claims, 3 Drawing Sheets

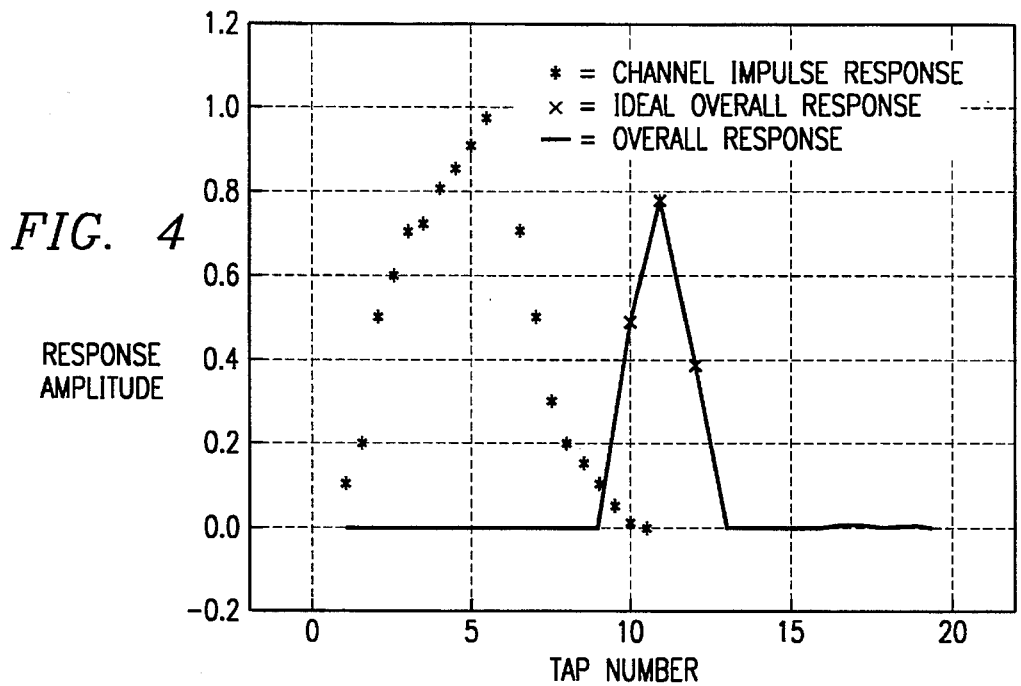

FIG. 4

```
% calculate the matrix to be eigenvalued
Delta = Ryy-Ryx*Ryx'/ep; % 1 multiply and one add size M1
invDelta = Inv(Delta); % 1 inverse size M1
St = invDelta*Ryx/ep; % multiply size (M1 x M1) by (M1 x v)
Sb=(eye(v)-Ryx'*St)/ep; % 1 multiply (v x M1) by (M1 x v)
%iterate on power method
q = ones(v,1);
for = 1:5
Z = Sb*q; % 1 multiply (vxv) by (vx1)
q =z /(sqrt(z'*z)); % 1 mag squared and divides on length M1 + v and a
    square root end
b = q;
mu = q'*Sb*q;
w = St*b/mu;
error_est = 1/mu;
```

FIG. 5

METHOD AND SYSTEM FOR OPTIMIZING AN EQUALIZER IN A DATA TRANSMISSION SYSTEM

TECHNICAL FIELD OF THE INVENTION

The present invention relates to the transmission and reception of signals, and more particularly, to a method and system for optimizing the equalization of a signal transmitted through a distorting channel.

BACKGROUND OF THE INVENTION

It is common in modem practice to convert analog signals to digital form for transmission. The analog signal is passed through a low-pass filter (to ensure that the signal is bandwidth limited), sampled, each sample converted to an n-bit binary word by an analog-to-digital converter, and then the bit stream is transmitted to a receiver which reconstructs the signal using a digital-to-analog converter and a low-pass filter.

Many modem digital communications systems, however, must encompass more than point-to-point digital communication. Many digital communications systems of today must also operate in networked environments which simultaneously connect a plurality of users allowing them to communicate with each other. Many of today's digital communications systems must further include the ability to transmit voice, video and data across the same transmission line. One example of such an all purpose digital communications system is the integrated services digital network (ISDN) which is currently undergoing worldwide standardization.

Asynchronous transfer mode (ATM) is a packet based communication protocol for use with an ISDN. Asymmetric Digital Subscriber Loops (ADSL) is a communications protocol defining communication across twisted pairs which may also be used on an ISDN. Discrete Multitone (DMT) was recently chosen as the standard modem for ADSL by the ANSI Standards Committee T1E1.4. Thus, any method that improves the performance or lowers the cost of a DMT system will therefore have potential widespread use in the DMT systems that will be designed over the next few years for use in ADSL and ISDN applications.

An initial operation that must take place before transmission using a DMT system is the equalization of the channel. Channel equalization is the technique of recovering transmitted signals which have been distorted by, among other things, intersymbol interference. Intersymbol interference results from various dispersion effects in the channel which broaden the pulses and cause them to interfere with one another. The Nyquist criterion, which assumes no intersymbol interference, generally cannot be satisfied unless the channel is first equalized, i.e., filtered to compensate for the channel dispersion.

In a single tone system, equalization tries to remove all intersymbol interference. In a DMT, however, channel equalization is necessary so that as much of the energy of the overall impulse response as possible is contained in a fixed number of symbol periods, called the cyclic prefix length of the DMT system. Several methods to optimally choose the equalizer in a DMT system have previously been proposed. These methods, however, are computationally complex and, as a result, require an enormous amount of computer memory and computer processing time in order to implement them.

A DMT system is a block based modulation system or modem used to transmit data across a twisted pair. A block based modulation system processes a set number of symbols in a given sequence as a group. The size of the block is constrained by system complexity considerations. For ADSL, the block size has been chosen to be 512 symbols. Because of the way in which a DMT system demodulates the signal, when a block of symbols of length N is transmitted over the channel, it must be prefixed by a block of symbols of length v called the cyclic prefix. The cyclic prefix, however, is merely a copy of the last v symbols of the data block and therefore contains no additional information. It is therefore desirable to make v as small as possible.

In an ideal DMT system, the cyclic prefix length v is constrained to be greater than the impulse response length of the channel (the length in symbol periods between the modulator and the demodulator). In most practical situations, the impulse response of the channel is too large and the size of the overall impulse response between the modulator and the demodulator must be reduced using a time domain equalizer (TEQ) so that the impulse response is zero outside of a finite region also of length v, called the response region.

The ideal DMT system is illustrated in FIG. 1. The system includes a modulator 10, which generates a signal output at 12 which includes data symbols of length N 14 and a cyclic prefix of length v 16. The signal output at 12 then goes through a distorting channel 18 of length H. The distorted signal at 20 from the distorting channel 18 is then equalized in a finite length equalizer 22 of length M. The equalized signal at 24 is then demodulated in demodulator 24 in preparation for further processing.

In a practical DMT system, however, it is usually impossible to exactly zero out the response outside the response region using a finite length equalizer. Thus, one problem is to find a filter, w, of length M such that when the filter w is convolved with the channel, h, the response of the overall response filter, $\tilde{h}$, has most of its energy within the response region. Mathematically, the overall response filter $\tilde{h}$ is $$\tilde{h} = h * w \qquad (EQ\ 1)$$

and we must find $$\arg_w \min\{\|\tilde{b} - \tilde{h}\|^2 : \text{s.t. (length } (\tilde{b}) \leq v)\}. \qquad (EQ\ 2)$$

In (EQ 2), $\tilde{b}$ is the ideal overall filter and is equivalent to the overall response filter $\tilde{h}$ with the taps outside the response region set to zero. It is important to note that the ideal overall response filter $\tilde{b}$ can be anything as long as it satisfies the length constraint where the length of a filter is defined as the distance between its first and last nonzero points. For example, the length of a filter with response [0, 0, 1, 0, 3, 0, 0, 0] is 3. This allows the introduction of a delay, Δ, if it decreases the energy in the response outside the response region.

Thus, the minimization of (EQ 2) is equivalent to minimizing the average error, or the optimization error, $\epsilon_k$, in the system where the ideal overall response filter $\tilde{b}$ includes the filter, b (the length v nonzero portion of the ideal overall response filter $\tilde{b}$) with a delay Δ added. The optimization error $\epsilon_k$ is thus equal to the output of the ideal overall response filter $\tilde{b}$ less the output of the overall response filter $\tilde{h}$.

Methods of the prior art are based on the realization that the problem is similar to the optimization problem for decision feedback equalization (DFE), where the filter w is the feedforward filter and the filter b is the feedback filter.

The only difference is that in the DMT case, the filter b does not have to be monic and causal (that is, the first tap does not have to be constrained to unity). Methods of the prior art therefore proposed the following algorithm shown which finds the optimum equalizer for a delay Δ over a range $\Delta_{min}$ to $\Delta_{max}$:

1. Estimate the cross correlation between the channel input $x_k$ and the channel output $y_k$ and the autocorrelation of the channel output $y_k$.
2. For delay $\Delta = \Delta_{min}$ to $\Delta_{max}$
   a. for i=1 to v
      (i) constrain the ith tap of the filter b to be unity
      (ii) minimize $\|\bar{b}-\bar{h}\|^2$ using the DFE minimization technique
3. Choose the minimum of all the solutions found.

In the methods of the prior art, however, for each iteration of step 2a (ii), the formation of two new matrices and a matrix inversion must be performed. Since v may be greater than thirty in practical DMT systems, this means that an enormous number of computations and data accesses must be performed for each delay Δ tried.

Thus, the essential problem with methods of the prior art is that the minimization step must be performed v times for each value of the delay Δ tried. It is because an unconstrained minimization will produce the result filter w equal to zero and filter b equal to zero, that methods of the prior art chose to apply v constraints similar to those applied in DFE optimization, i.e., forcing each tap in turn to be unity and optimizing the other taps.

What is needed is a system and method of equalizing a signal transmitted through a distorting channel which is computationally less complex than methods and systems of the prior art thus using less processor time and computer memory and being suitable for implementation using either a programmable digital signal processor, a dedicated ASIC or a general purpose digital computer.

SUMMARY OF THE INVENTION

The present invention comprises a method and system for equalizing a signal transmitted through a distorting medium which is computationally less complex and uses less computer time and memory than methods and systems of the prior art. The method and system of the present invention is thus more suitable for implementation using either a programmable digital signal processor, a dedicated digital ASIC or a general purpose digital computer.

In accordance with one preferred embodiment of the present invention, the method includes generating a set of equalizer parameters defining an equalizer used to equalize a multicarrier data signal that has been transmitted through a distorting channel to a receiver, the receiver including the equalizer. This method comprises the steps of sending a training sequence through the channel to the equalizer; estimating correlations of channel input and channel output using the received sequence, and a local replica of the training sequence; and generating the set of equalizer parameters using power method and the correlations.

The system in accordance with one embodiment of the present invention includes a modulator, equalizing means coupled to the modulator which generates an equalized signal from a signal received from the modulator using the power method; and a demodulator coupled to the equalizer which prepares the equalized signal for further use.

BRIEF DESCRIPTION OF THE DRAWINGS

The above mentioned objects, advantages and features of the present invention are described below in connection with the accompanying drawings, wherein:

FIG. 4 shows a plot of the original, overall equalized and overall ideal responses of the system of the present invention; and FIG. 5 illustrates a Matlab program implementation of the method of the present invention.

DETAILED DESCRIPTION OF THE INVENTION

The present invention is a method and system for equalizing a signal transmitted through a distorting medium.

Figure 1:
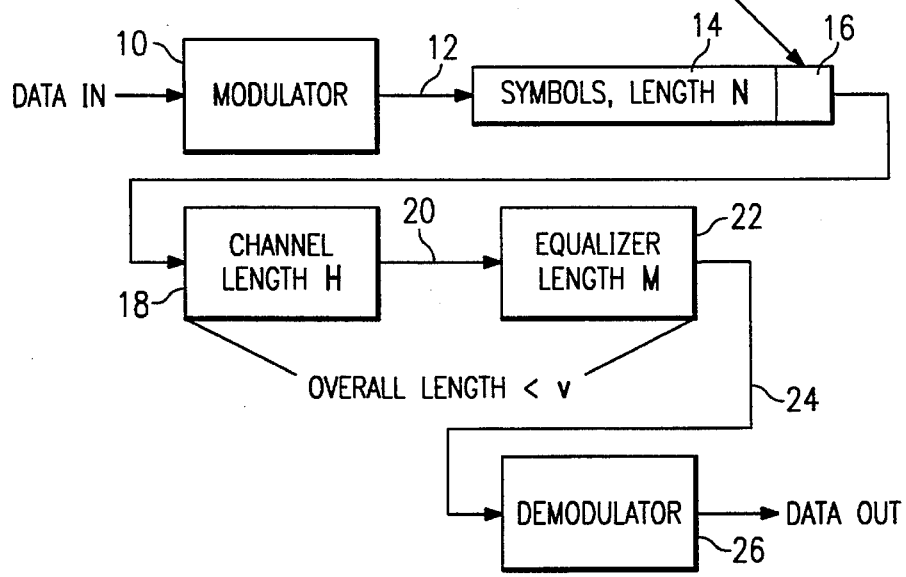
FIG. 1 is a block diagram of a simplified DMT system.
Figure 2:
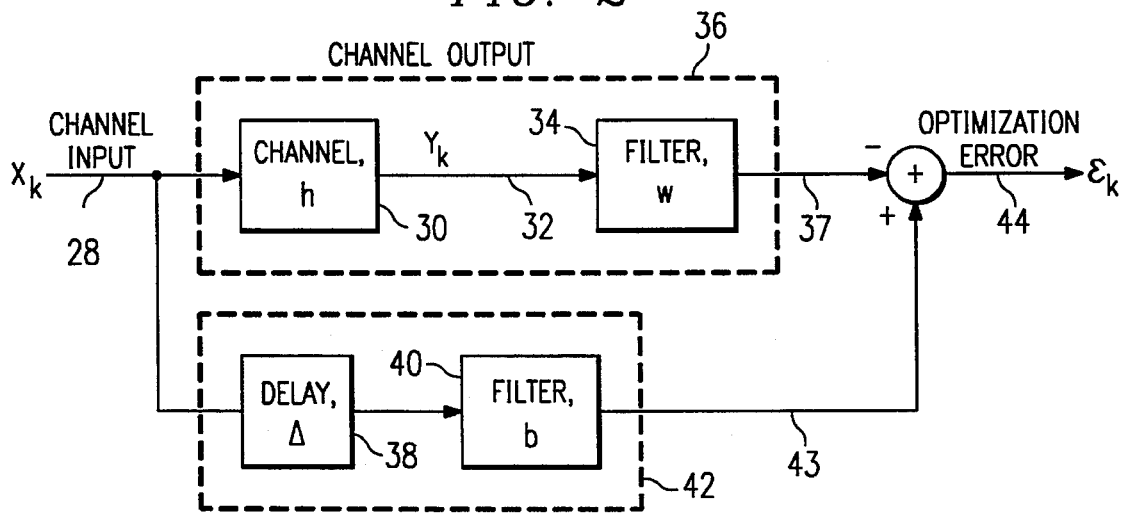
FIG. 2 is a block diagram useful for illustrating generally the minimization technique of the present invention.

The present invention finds the correct constraint rather than merely applying a series of DFE-like constraints. First, as illustrated in FIG. 2, note that if the taps of the filter w 34 and the filter b 40 are all multiplied by the real number K, then the error power has increased by $K^2$. This is not a worse case solution, however, because the energy in output at 43 of the ideal overall response filter $\bar{b}$ 42 has also increased by $K^2$. In a DMT system the effect of the energy outside the response region is determined by the relative energy outside the response region compared to that inside the response region. Therefore, the correct function to minimize is the ratio of the energy in the output at 43 of the ideal overall response filter $\bar{b}$ 42 to the energy in the output at 37 of the overall response filter $\bar{h}$ 36 that is outside the response region. One method of accomplishing this is to minimize (EQ 2) subject to the constraint $$\|b\|^2=1 \tag{EQ 3}$$

One embodiment of the method of the present invention thus minimizes (EQ 2) subject to the above constraint in (EQ 3) for the more general fractionally spaced equalizer. The following discussion proves the correctness of the minimization technique of the present invention. Although illustrated using the more general fractionally spaced equalizer, the method of the present invention and the following discussion also applies to the more specific symbol rate equalizers in that a symbol rate equalizer is a fractionally spaced equalizer with l equal to one.

When the channel output $y_k$ at 32 received through the channel h 30 is sampled at l times the symbol rate, the channel can be thought of as a vector channel producing length l column vectors for each symbol with the channel output $y_k$ at 32 given by $$y_k = h_0 x_k + h_1 x_{k-1} + \ldots + h_i x_{k-i} + \ldots \tag{EQ 4}$$

If the equalizer filter w 34 is constrained to be M symbols long then it uses channel output $y_k$ at 32 data vectors $y_k$ back to $y_{k-M}$. If a delay Δ 38 is introduced, then the channel input $x_k$ at 28 data in the filter b 40 is $x_{k-\Delta}$ back to $x_{k-\Delta-v}$ where v is the cyclic prefix length. Therefore, defining the column vectors of length lM+v to be $$u_k = [y^T_k, \ldots, y^T_{k-M}, x_{k-\Delta}, \ldots, x_{k-\Delta-v}]^T \tag{EQ 5}$$

and $$v = [-w^T, b^T]^T, \tag{EQ 6}$$

we get from FIG. 2 that the equation for the optimization error, $\epsilon_k$, at 40 is $$\epsilon_k = v^T u_k. \quad \text{(EQ 7)}$$

Thus, the problem is to minimize $$E[\|v^T u\|^2] = v^T R_{uu} v \quad \text{(EQ 8)}$$

where $E[.]$ is the expectation operator and $R_{uu}$ is the correlation matrix of $U_k$. The constraint in (EQ 3) can be expressed in terms of $v$ as $$v^T \tilde{I} v = 1 \quad \text{(EQ 9)}$$

where $\tilde{I}$, the complementary identity matrix, is defined as $$\tilde{I} = \begin{bmatrix} 0 & 0 \\ 0 & I \end{bmatrix} \quad \text{(EQ 10)}$$

and $I$ is the identity matrix (a matrix filled with zeroes everywhere except for ones along the diagonal). The correlation matrix, $R_{uu}$, is equal to $$R_{uu} = \begin{bmatrix} R_{yy} & R_{yx} \\ R_{yx}^T & R_{xx} \end{bmatrix} \quad \text{(EQ 10)}$$

where $R_{yy}$ is the autocorrelation of $[y^T_k, \ldots, y^T_{k-M}]$, $R_{xx}$ is the autocorrelation of $]x_{k-\Delta}, \ldots, x_{k-\Delta-v}]$ and $R_{yx}$ is the cross correlation between the two vectors $R_{xx}$ and $R_{yy}$. The matrix $R_{xx}$ will be known in advance and the other two matrices, $R_{yy}$ and $R_{yx}$, will be generated from the channel output $y_k$ at 32 resulting from the use of a predefined training sequence. A training sequence is a predetermined sequence stored in both the modulator and demodulator and used, among other things, as a known input to equalize the channel to which the communications equipment is connected.

Equation (EQ 8) can be solved with respect to constraint (EQ 9) by minimizing the Lagrangian $$\Gamma v^T R_{uu} v + \lambda v^T \tilde{I} v \quad \text{(EQ 12)}$$

with respect to (EQ 9). Vector differentiation and rearrangement gives the solution as $$R_{uu}^{-1} \tilde{I} v = -\lambda^{-1} v \quad \text{(EQ 13)}$$

The maximum value of $-\lambda^{-1}$ is equal to $\mu$, the maximum eigenvalue of the solution matrix, $R^{-1}_{uu} \tilde{I}$.
Inserting $\mu$ and rearranging gives $$\tilde{I} v = \mu R_{uu} v \rightarrow \frac{1}{\mu} = \frac{(v^T R_{uu} v)}{(v^T \tilde{I} v)} \quad \text{(EQ 14)}$$

Note that any eigenvalue of the solution matrix, $R^{-1}_{uu} \tilde{I}$, must be nonnegative as it can be expressed as in (EQ 14), and the numerator and denominator in (EQ 14) are both greater than or equal to zero for all $v$.

Since $\mu$ is the maximum value from (EQ 13), $\mu^{-1}$ is the minimum value of (EQ 8) under the constraint in (EQ 9) and $v_{opt}$, the eigenvector associated with $\mu$, is the vector that minimizes the problem. Therefore, from (EQ 6), the correct parameters defining equalizer 34 can be found from the eigenvector associated with the maximum eigenvalue of the solution matrix, $R^{-1}_{uu} \tilde{I}$.

The basic algorithm of one embodiment of the method of the present invention is therefore:

1. Build the correlation matrix, $R_{uu}$, by generating the cross correlation between the channel input $y_k$ at 32 and the channel output $x_k$ at 28 and the auto correlation of the channel output $y_k$ at 32.

2. For delay $\Delta 38 = \Delta_{min}$ to $\Delta_{max}$
   a. Find $[-w^T, b^T]$, the eigenvector associated with the maximum eigenvalue, $\mu$, of the solution matrix, $R^{-1}_{uu} \tilde{I}$.
   b. Normalize the eigenvector so that the filter b 40 has unit magnitude.

3. Choose the solution with maximum $\mu$.

Note that since the channel output $y_k$ at 32 is not dependent upon the delay $\Delta 38$, only the channel input $x_k$ at 28 changes for each delay $\Delta 38$ tried. Therefore, in practice, the channel input $x_k$ at 28 is delayed simply by shifting the vector $x_k$ in time for each unit of delay $\Delta 38$ desired from the channel input $x_k$ at 28 sequence (or training sequence) used. In practice, a large cross correlation matrix is estimated in advance and a submatrix of this matrix chosen for each delay $\Delta 38$ used.

Although this algorithm is much more straightforward than algorithms of the prior art, an algorithm that has even lower computational complexity is easily derived. In practice, a white input training sequence of power $\xi_x$ is used to generate the channel output $y_k$ at 32 from which the cross correlations are formed. From (EQ 10), (EQ 11), and (EQ 13), we want to find the maximum eigenvalue of $$R^{-1}_{uu} \tilde{I} = \begin{bmatrix} 0 & S_t \\ 0 & S_b \end{bmatrix} \quad \text{(EQ 15)}$$

To achieve the lower computational complexity, a second embodiment of the method of the present invention uses a matrix inversion lemma, described in the textbook *Linear Systems* by Thomas Kailath on page 656, to perform the matrix inversion required in (EQ 15). Thus, using the matrix inversion lemma, it can be shown that $\mu$ is also the maximum eigenvalue of the $v \times v$ matrix $S_b$, which, for a white Gaussian noise input training sequence of power $\xi_x$, is equal to $$S_b = (I - R_{yx}^T S_t) / \xi_x \quad \text{(EQ 16)}$$

where $R_{xy}$ is the cross correlation matrix of the input and output vectors and where $$S_t = -(R_{yy} - R_{yx} R_{yx}^T / \xi_x)^{-1} R_{yx} / \xi_x \quad \text{(EQ 17)}$$

It is also easily shown that an optimum ideal response filter, $b_{opt}$, is the unit magnitude eigenvector associated with $\mu$ and that an optimum equalizer is given by $$w_{opt} = -S_t b_{opt} / \mu. \quad \text{(EQ 18)}$$

Hence, as $R_{yy}$ is constant for any delay $\Delta 38$, the operations required for each delay $\Delta 38$ are the formation of one matrix from the data in a larger, precalculated matrix, an inverse of an Ml×Ml matrix (in (EQ 17)), calculation of the maximum eigenvalue of a $v \times v$ matrix and a few matrix multiplies. Thus, a key to the method of the present invention is that, in practice, a good approximation to the maximum eigenvector can be easily found using an eigenvector generation method. One such method used in one embodiment of the method of the present invention is called the power method. The power method and other power iterations are described in detail in the textbook *Matrix Computations*, Second Edition by Gene H. Golub et al. on pages 351–361.

For each delay $\Delta 38$ used, prior art methods require the formation of $v$ matrices and $v$ inverses of $(Ml+v) \times (Ml+v)$ matrices which, because $v$ is generally greater than 30 in ADSL applications, makes prior art algorithms much more computationally complex. The requirement of the formation of many matrices of prior art algorithms may also increase the number of memory accesses necessary.

The method of the present invention, however, significantly reduces the computational complexity of determining the equalizer filter w 40 by forming one correlation matrix, $R_{uu}$, by performing a matrix inversion of the correlation matrix $R_{uu}$ using the matrix inversion lemma, by generating an eigenvector associated with a maximum eigenvalue of a function of the inverted correlation matrix using power method iteration and finally by normalizing the eigenvector from which the equalizer parameters are calculated.

FIG. 5 shows an implementation of the method of the present invention in Matlab. (Matlab is a programmable simulation tool which runs on a general purpose computer). For clarity, in the Matlab code shown in FIG. 5, the correlation estimation steps are omitted as they are done by standard methods. The method of the present invention has also been implemented in the programming language C as part of a larger DMT system simulation effort. The results given below were obtained from the C implementation.

Figure 3:
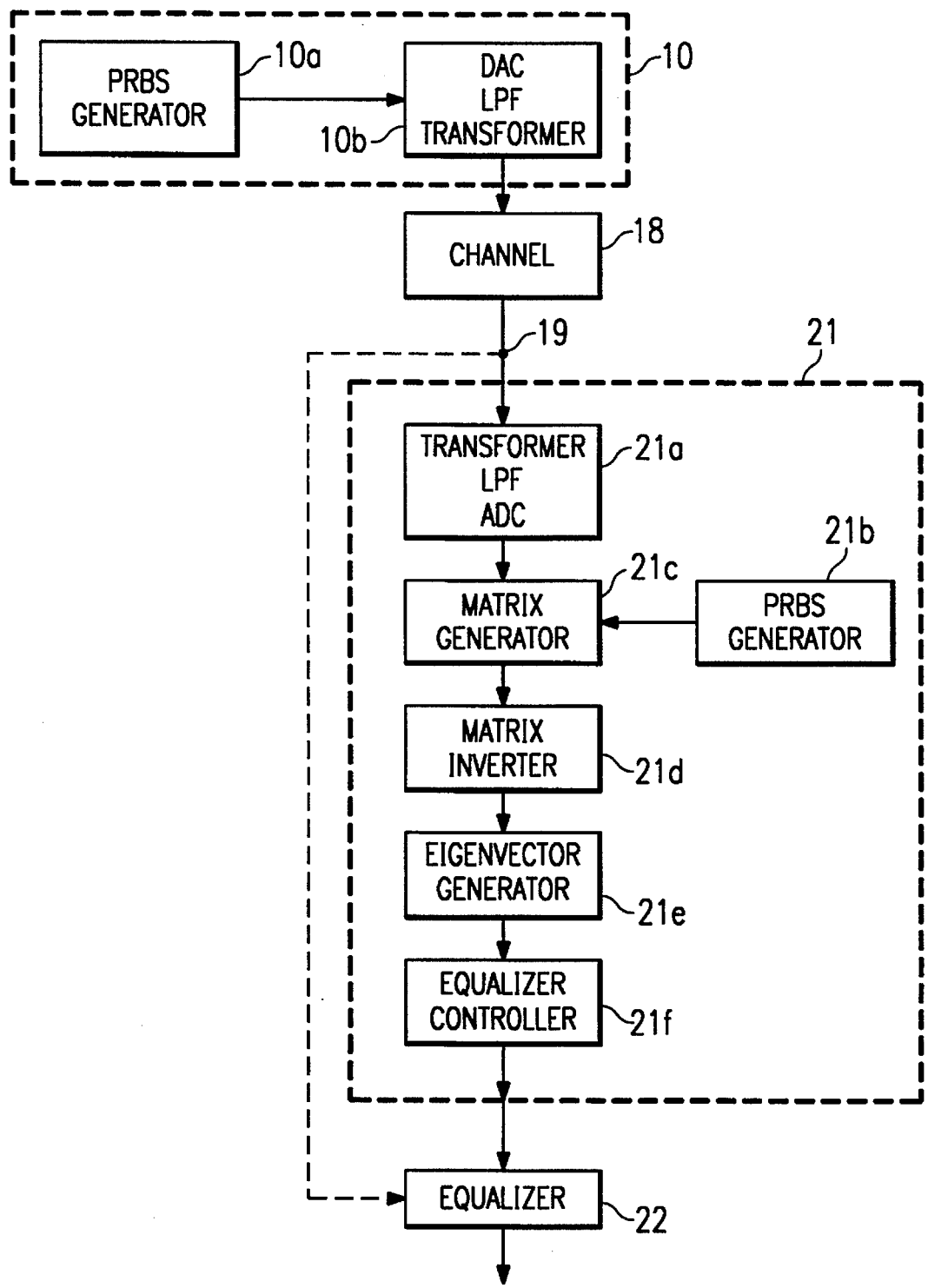
FIG. 3 illustrates one embodiment of the system of the present invention.

The system of the present invention, as illustrated in FIG. 3, includes an equalizer 22 generated using the method of the present invention described above. FIG. 3 shows a modulator 10 which include a pseudo random bit sequence (PRBS) generator 10a and post-processing means 10b. Post-processing means 10b includes means for adding the cyclic prefix of length v 16, means for performing a digital-to-analog conversion, low pass filter means and transformer means. The modulator 10 is coupled to a channel 18. The channel 18 is coupled by a switch 19 to equalizer initialization means 21 and to equalizer 22. During initialization, the switch 19 connects the modulator 10 to the equalization means 21. Once the equalizer 22 has been initialized, the switch 19 is flipped so that the modulator 10 is connected to equalizer 22. At anytime during operation of the transmission system shown in FIG. 3, the modulator 10 may be reconnected to equalizer initialization means 21 to reconfigure equalizer 22, for example, after a predetermined number or type of transmissions errors are detected.

Equalizer initialization means 21 includes a preprocessor 21a and a PRBS generator 21b both of which are connected to matrix generation means 21c. Matrix generation means 21c is then coupled to matrix inversion means 21d. Matrix inversion means 21d is then connected to eigenvector generation means 21e. Eigenvector generation means 21e is then coupled to equalizer control means 21f. The equalizer initialization means 21 may be implemented using one or more digital signal processor (DSP) chips such as the TMS320C3x DSP chip manufactured by the assignee, Texas Instruments, Inc. The number of DSP chips used to implement the equalizer initialization means 21 depends primarily upon processing speed considerations.

The PRBS generators 10a and 21b generate a predetermined training sequence used to equalize the demodulator 26 to channel 18. The post-processing means 10b, prepares the training sequence from the PRBS generator 10a for transmission through channel 18. Once the channel output signal is received, the preprocessor means 21a in equalizer initialization means 21 converts the signal into a digitized received sequence. Preprocessor means 21a includes means for removing the cyclic prefix of length v 16 from the received signal, means for transforming the received signal, low pass filter means and analog-to-digital conversion means.

The PRBS generator 21b generates a replica local with respect to the device receiving the channel output at 32 of the same training sequence used as input to channel 18 by the modulator 10. Both the received sequence and the local replica of the training sequence are input into matrix generation means 21c. Matrix generation means 21c generates the required cross and auto correlations using the received sequence and the local replica of the training sequence.

The auto and cross correlation matrices are then sent to matrix inversion means 21d. In one embodiment of the system of the present invention, matrix inversion means 21d forms the correlation matrix, $R_{uu}$, and then inverts the correlation matrix, $R_{uu}$, using matrix inversion. The solution matrix, $R^{-1}_{uu}\tilde{I}$, is then formed by multiplying the inverted correlation matrix, $R^{-1}_{uu}$, by the complementary identity matrix, $\tilde{I}$. In another embodiment of the system of the present invention, matrix inversion means 21d generates the nonzero elements of the solution matrix, $R^{-1}_{uu}\tilde{I}$, using the matrix inversion lemma described above.

The solution matrix, $R^{-1}_{uu}\tilde{I}$, is then sent to eigenvector generation means 21e where, in one embodiment of system of the present invention, a maximum eigenvector associated with a maximum eigenvalue of the solution matrix, $R^{-1}_{uu}\tilde{I}$, is calculated. In another embodiment of the system of the present invention, the maximum eigenvector associated with a maximum eigenvalue of the solution matrix, $R^{-1}_{uu}\tilde{I}$, is generated using the power method described above.

The eigenvector generated by eigenvector generation means 21e is then used in equalizer controller means 21f to generate control parameters (taps) defining the filter which performs as equalizer 22. The equalizer 22 may be implemented using an equalizer chip such as the HSP43168 manufactured by Harris Corporation.

In a C simulation of the method and system of the present invention on a programmable digital computer including a monitor, keyboard, and processing means, the channel output $y_k$ at 32 was sampled at two times the symbol rate. The output $y_k$ at 32 of channel h 30 was ten symbols in duration. Given in the format of (EQ 4), the output $y_k$ at 32 of channel h 30 was $$h = [h_0 h_1 \ldots] = \begin{bmatrix} 0.1, 0.5, 0.70, 0.80, 0.90, 0.8, 0.5, 0.20, 0.10, 0.01 \\ 0.2, 0.6, 0.72, 0.85, 0.97, 0.7, 0.3, 0.15, 0.05, 0.00 \end{bmatrix} \quad \text{(EQ 19)}$$

Additive white Gaussian noise of power 0.0001 was added to the channel. Ten thousand training symbols, taken from a pseudo random binary sequence (PRBS), were used to estimate the channel correlations. The cyclic prefix length, v, was 3 and the equalizer length, M, was 10. The simulation program searched over a range of delays Δ38 from $\Delta_{min}$ to $\Delta_{max}$ and chose the best solution. The best solution for the sample output $y_k$ at 32 of channel h 30 given above was found to be:

w=[−0.0625, 0.299, −1.676, 1.499, −0.638, 1.134, 1.208, −0.705, 1.508, −1.820, −0.457, −0.333, −1.295, 2.167, −0.189, 0.245, 0.732, −0.284, 0.148, −0.533]$^T$ to 3 decimal places, and b=[0.4889, 0.7791, 0.3923]$^T$ to 4 decimal places and a delay Δ38 equal to 10, the length of the channel. The estimated error energy from the inverse of the eigenvalue was 0.003776. The resultant responses of channel h 30, overall response filter h̃ 36, and of the ideal overall response filter b 40, are plotted in FIG. 4.

The equalizer optimization method of the present invention is also applicable in maximum likelihood sequence detection (MLSD) in communications. MLSD is a minimum mean squared error solution to data estimation on a channel with intersymbol interference. Normally, the complexity of MLSD prevents its use except on channels with short impulse responses. The method of the present invention, however, may be used to reduce the effective length of the channel impulse response before MLSD is applied to the channel, thus making MLSD a realistic solution for channels with long impulse responses.

Although the present invention has been described in detail, it should be understood that various changes, substitutions and alterations can be made thereto without departing from the spirit and scope of the present invention as defined by the appended claims.

What is claimed is:

1. A method, in a data transmission system, for optimizing an equalizer, said equalizer used to equalize a signal transmitted through a distorting channel, comprising the steps of:

sending a known training sequence of data bits through said channel to generate a received signal, said received signal including said known training sequence of data bits;

generating a local replica of said training sequence;

generating correlations of said received signal and said local replica of said training sequence;

generating an eigenvector associated with a maximum eigenvalue of a function of said correlations;

generating equalizer control signals from said eigenvector; and altering said equalizer using said equalizer control signals.

2. A method, in a data transmission system, for optimizing an equalizer, said equalizer used to equalize a signal transmitted through a distorting channel, comprising the steps of:

sending a known training sequence of data bits through said channel to generate a received signal, said received signal including said known training sequence of data bits;

generating a local replica of said training sequence;

generating correlation matrices using said received signal and said local replica of said training sequence;

forming a solution matrix using said correlation matrices;

generating an eigenvector associated with a maximum eigenvalue of said solution matrix;

generating equalizer control signals from said eigenvector; and altering said equalizer using said equalizer control signals.

3. The method of claim 2 wherein said solution matrix formation step includes the step of generating said solution matrix from said correlation matrices using a matrix inversion lemma.

4. The method of claim 2 wherein said eigenvector generation step includes the step of generating said maximum eigenvector using power method iteration.

5. A method, in a data transmission system, for optimizing an equalizer, said equalizer used to equalize a signal transmitted through a distorting channel, comprising the steps of:

sending a known training sequence of data bits through the channel to generate a received signal, said received signal including said known training sequence of data bits;

generating a local replica of said training sequence;

generating autocorrelation and cross correlation matrices using said received signal and said local replica of said training sequence;

generating a correlation matrix using said autocorrelation and cross correlation matrices;

inverting said correlation matrix, forming an inverted correlation matrix;

generating a complementary identity matrix;

generating a solution matrix by multiplying said inverted correlation matrix by said complementary identity matrix;

generating an eigenvector associated with a maximum eigenvalue of said solution matrix;

generating equalizer control signals from said eigenvector; and altering said equalizer using said equalizer control signals.

6. The method of claim 5, wherein said eigenvector generation step includes the step of generating said eigenvector using power method iteration.

7. The method of claim 5, wherein said autocorrelation and cross correlation matrices generation step includes the steps of:

generating a first autocorrelation by autocorrelating said received sequence;

generating a second autocorrelation matrix by autocorrelating a local replica of said training sequence;

generating a first cross correlation matrix by cross correlating said local replica of said training sequence and said received signal; and generating a second cross correlation matrix by transposing said first cross correlation matrix.

8. The method of claim 5 wherein said solution matrix formation step includes the step of generating said solution matrix from said correlation matrices using a matrix inversion lemma.

9. A system for equalizing a signal transmitted through a distorting channel, the system comprising:

means for transmitting a known training sequence of data bits through the channel to generate a received signal;

means for generating a local replica of said training sequence;

means responsive to said received signal for generating an eigenvector associated with a maximum eigenvalue of a function of said received signal and said local replica of said training sequence using power method iteration;

means responsive to said eigenvector for generating equalizer control signals; and means responsive to said equalizer control signals for adjusting an equalizer to said distorting channel.

10. The system of claim 9, the eigenvector generating means further including:

first means for generating a correlation matrix containing auto correlations and cross correlations of said received signal and said local replica of said training sequence;

second means for inverting said correlation matrix, generating a solution matrix; and third means coupled to said second means for generating said eigenvector associated with said solution matrix using power method iteration.

11. The system of claim 10, wherein said first means includes means for generating said correlation matrix using a matrix inversion lemma.

* * * * *